United States Patent
Dietrichson et al.

(10) Patent No.: US 6,818,833 B2
(45) Date of Patent: Nov. 16, 2004

(54) COILING FRAME FOR OPTICAL FIBER COMPOSITE GROUND WIRE

(75) Inventors: Per Henrik Dietrichson, Oslo (NO); Kjell Grinden, Nordby (NO)

(73) Assignee: Nexans (FR)

( * ) Notice: Subject to any disclaimer, the term of this patent is extended or adjusted under 35 U.S.C. 154(b) by 0 days.

(21) Appl. No.: 10/429,272

(22) Filed: May 2, 2003

(65) Prior Publication Data

US 2004/0035600 A1 Feb. 26, 2004

(30) Foreign Application Priority Data

May 3, 2002 (NO) .......................................... 2002 2130

(51) Int. Cl.[7] .............................. H01B 7/00; H02G 7/06
(52) U.S. Cl. ........................ 174/135; 174/40 R; 174/41; 174/44; 174/45 R
(58) Field of Search ......................... 174/37, 38, 40 R, 174/40 CC, 41, 42, 43, 44, 45 R

(56) References Cited

U.S. PATENT DOCUMENTS

| | | | | |
|---|---|---|---|---|
| 5,022,600 A | * | 6/1991 | Blanc et al. ............. | 242/378.2 |
| 5,092,663 A | * | 3/1992 | Hivner ........................ | 385/100 |
| 5,640,482 A | * | 6/1997 | Barry et al. ................. | 385/135 |
| 5,683,073 A | * | 11/1997 | Pickrell .............. | 254/134.3 FT |
| 5,970,199 A | * | 10/1999 | Minchey et al. ............ | 385/134 |
| 6,361,360 B1 | * | 3/2002 | Hwang et al. .............. | 439/501 |
| 6,398,149 B1 | * | 6/2002 | Hines et al. ................ | 242/399 |

FOREIGN PATENT DOCUMENTS

| | | | | | |
|---|---|---|---|---|---|
| FR | 2621185 A | * | 9/1987 | ............ | H02G/7/04 |
| JP | 07-162164 A | * | 6/1995 | ............ | H05K/7/00 |
| JP | 09-233664 A | * | 5/1997 | ............ | H02G/4/20 |

\* cited by examiner

*Primary Examiner*—William H. Mayo, III
(74) *Attorney, Agent, or Firm*—Sofer & Haroun, LLP

(57) ABSTRACT

A frame is provided for coiling the surplus length of an overhead cable when two cable sections are spliced in a splicing box. The frame is particularly adapted to be used with Optical Fiber Composite Ground Wires (OPGW) and has a coiling chamber for the coiling of the surplus splice length. The coiling chamber has an interior in which the surplus splice length is coiled, and an outer edge, allowing the free rotation of the frame about a shaft. The surplus splice length is pushed from underneath by an operator and is further pushed and held by its own restoring force against the outer edge of the coiling chamber, where the pushing and holding effects induce the rotation of the frame.

19 Claims, 2 Drawing Sheets

FIG_1
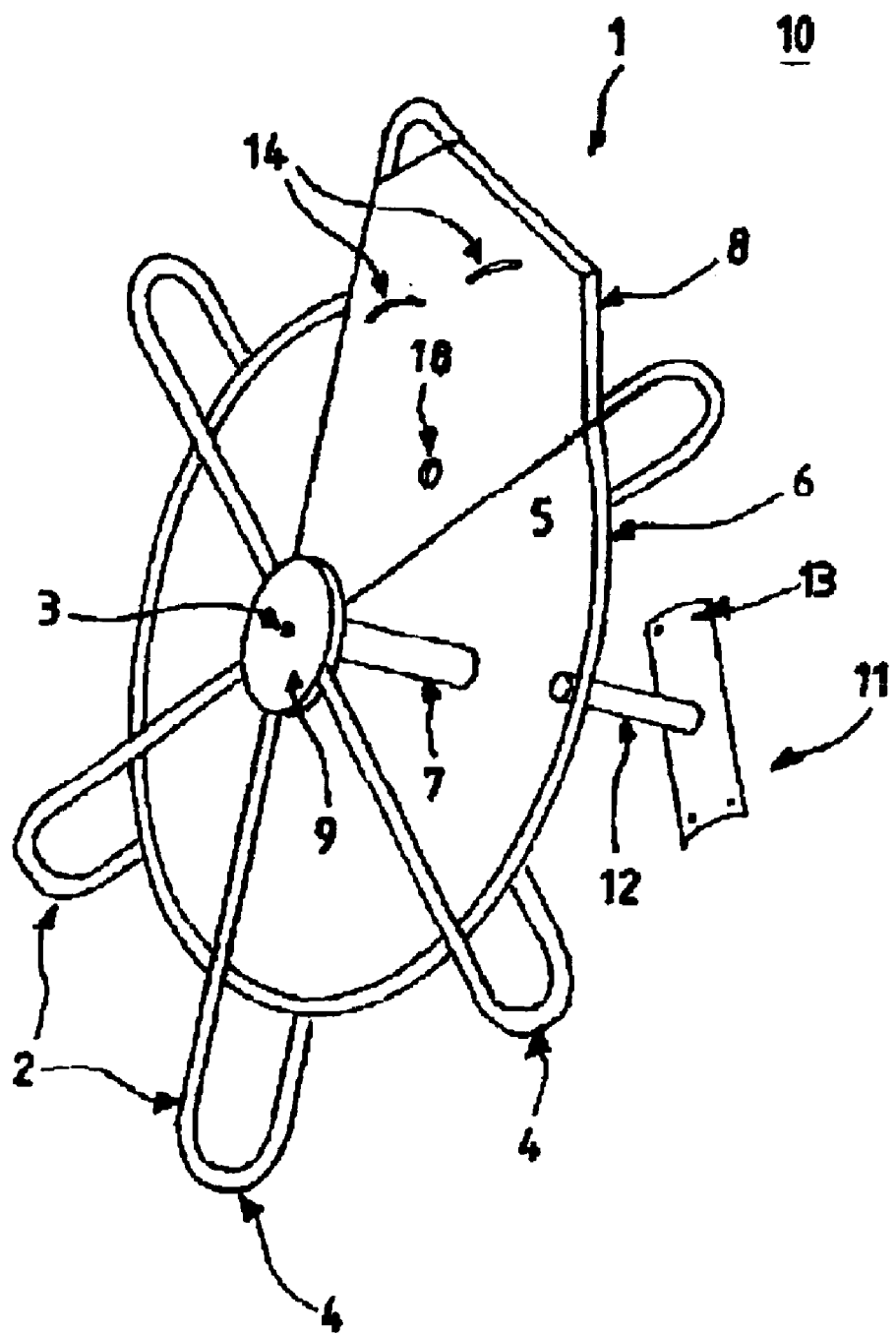

FIG_2
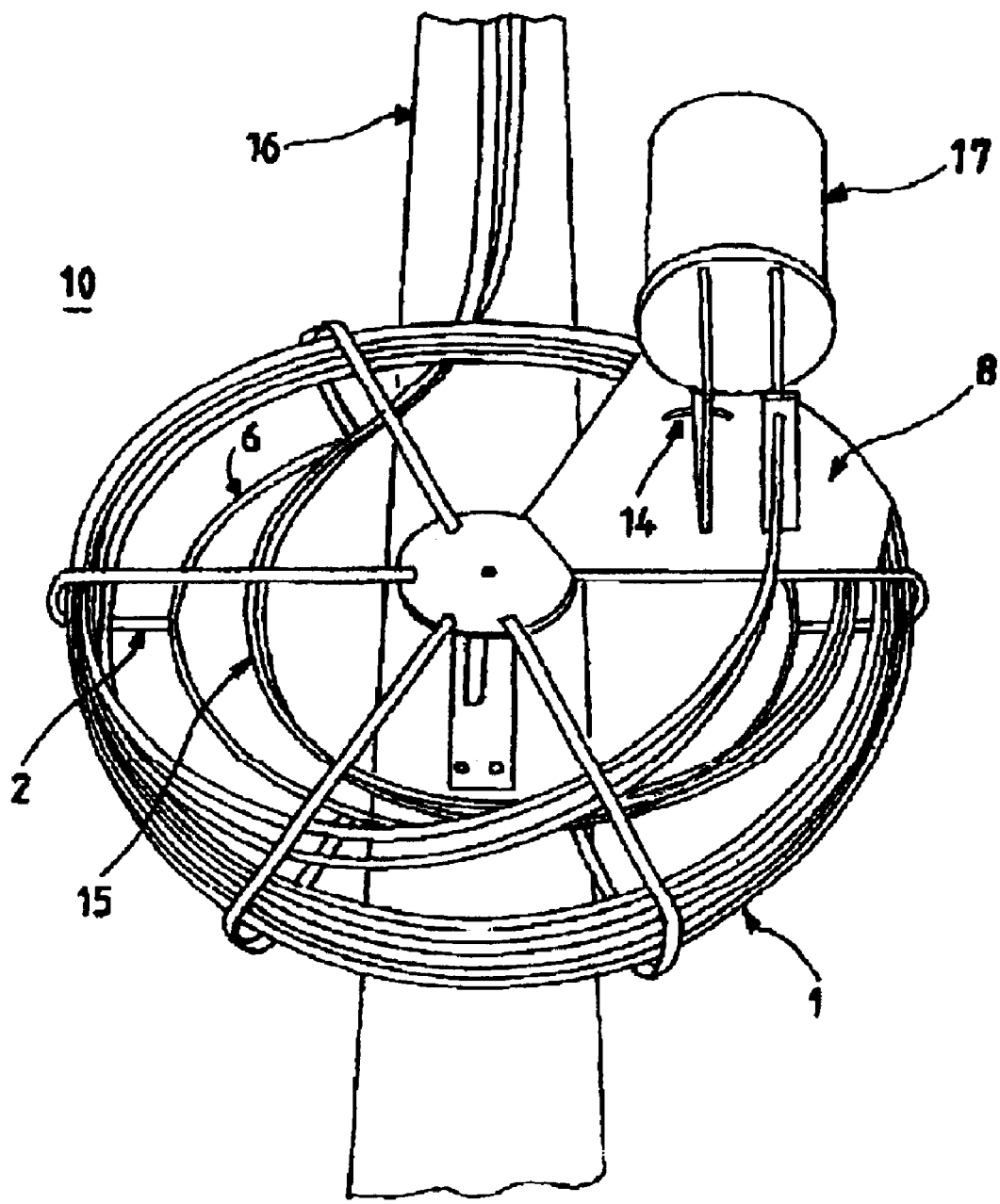

COILING FRAME FOR OPTICAL FIBER COMPOSITE GROUND WIRE

RELATED APPLICATION

This application is related to and claims the benefit of priority from Norwegian Patent Application No. 2002 2130, filed on May 3, 2002, the entirety of which is incorporated herein by reference.

BACKGROUND

1. Field of the Invention

The present invention relates to a frame for coiling the surplus length of an overhead cable when two cable sections are spliced in a splicing box. Such cables are usually suspended from wooden/concrete poles or from steel towers. The invention is particularly adapted to be used with Optical Fiber Composite Ground Wires (OPGW). This is a rather rigid product.

2. Description of Prior Art

As is known, an optical fiber is capable of transmitting a large amount of information with a very low transmission loss and is a good insulator with no electromagnetic induction. It has therefore been proposed to provide the ground wire used in connection with overhead power transmission lines with an optical fiber cable in the center to form an economical information loop or network.

There is sometimes a need to splice two OPGW cables. Such splicing is required when two cable sections have to connected at a pole or tower.

An operator who will put the spliced connection in a splicing box makes this operation on the ground. To do this, the operator needs to have an overlength or surplus of cable. After the splicing operation, excess lengths that are no longer required have to be stored several meters above the ground level.

The only known solution consists in using a static X-shaped frame around which the cable is coiled so as to be latched into four slits that turns outwards, a latch pin being placed on the top of each slit to prevent the cable to coil out. This X-shaped frame is fixed at a desired height to a wooden pole or a steel tower. This solution induces some difficult problems because of the manpower required to coil the cable and in order to force it into the slits of the frame mounted on the wooden pole or the steel tower.

OBJECT AND SUMMARY OF THE INVENTION

An object of the invention is to provide a frame for coiling the surplus length of a spliced overhead cable allowing to coil the cable easily without excessive manpower.

More precisely, the invention provides a frame for coiling a surplus splice length of an overhead cable installed on poles or towers characterized in that said frame comprises a coiling chamber for the coiling of said surplus splice length, said coiling chamber comprising:

an interior in which said surplus splice length is coiled, an outer edge allowing the free rotation of said frame about a shaft, said surplus splice length being pushed from underneath by an operator and being further pushed and held by its own restoring force against said outer edge of said coiling chamber, said pushing and holding effects inducing said rotation of said frame.

Thus, using this frame, the coiling becomes very easy. When the operator starts indeed to push the cables from underneath, the restoring force of the surplus splice length will push and hold the cable in the outer edge of the coiling chamber and make it possible to start the rotation of the frame. This restoring force is a self-going force of the surplus splice length that shoves said surplus splice length inside said coiling chamber.

Advantageously, said frame comprises an axle in the center of said chamber. The axle can be a hollow axle to be fitted into the shaft in order to allow the rotation of said frame around said shaft.

Furthermore, said axle includes means for locking the coiling frame in order to prevent a rotation of said frame and to prevent said frame from falling down.

Advantageously, the frame has a circular shape.

In a preferred embodiment, said frame comprises at least four stems extending from the center of said frame, each one of said stems having a U-shaped folded up end delimiting said interior of said coiling chamber.

Advantageously, said frame comprises six stems and said coiling chamber has a circular shape, each stem being on the opposite side of another stem along a diameter of said coiling chamber.

Advantageously, the opening of U of said U-shape is turned towards the center of said frame.

In a preferred embodiment, said U-shaped end is connected to a ring centered in the center of said chamber.

Advantageously, the frame comprises a fastening plate in order to fasten a splicing box to said frame.

Furthermore, said fastening plate can comprise means for adjusting the position of said splicing box.

Another object of the present invention is to provide a system for splicing overhead cable comprising a frame according to the invention, said system including means for attaching said frame to a predetermined height of a pole or a tower.

In a preferred embodiment, said frame comprises a hollow axle in the center of said chamber, said means for attaching including a shaft, said hollow axle being rotatable around said shaft.

In one embodiment, said means for attaching is a curved base plate such that said frame can be attached to a cylindrical pole like a wooden pole.

In another embodiment, said means for attaching is a plane base plate such that said frame can be attached to a steel tower.

Advantageously, the system comprises a fastening plate in order to fasten a splicing box to said frame and a splicing box fastened to said fastening plate.

The system may comprise means for including a branch-off overhead or underground cable in the frame and in the splicing box.

Another object of the present invention is to provide a method for coiling a surplus splice length of an overhead cable installed on a pole or a tower using a system according to the invention and having the following steps:

threading the cable ends to be splice inside said chamber on the ground, splicing said cable ends and installing the splice in said splicing box on the ground, two portions of cable representing said surplus splice length, fastening said splicing box to said fastening plate of said frame, lifting said frame with said splicing box at said predetermined height of said pole or said tower, snapping said frame onto said shaft, pushing said surplus splice length from underneath, said surplus splice length being further pushed and held by its own restoring force against said outer edge of said coiling chamber, said pushing and holding effects inducing said rotation of said frame.

BRIEF DESCRIPTION OF DRAWINGS

Other characteristics and advantages of the invention will appear on reading the following description of embodiments of the invention, given by way of example and with reference to the accompanying drawings, in which:

FIG. 1 is a diagram showing a system of the invention,

FIG. 2 is a diagram showing a system of the invention mounted on a wooden pole.

DETAILED DESCRIPTION OF THE INVENTION

In all these figures, elements which are common, i.e. which perform the same functions, are given with the same reference numerals.

FIG. 1 shows a system 10 according to the invention comprising a frame 1 according to the invention and a base plate 11.

The frame 1 has a circular shape for coiling the surplus length of an overhead cable and comprises:
- six stems 2 extending from the center 3 of the frame,
- a ring 6 centered in center 3,
- an hollow axle 7 provided with means for preventing the frame from falling off and means for preventing/allowing rotation of the frame,
- a fastening plate 8,
- a disc 9.

The base plate 11 is curved to easily fit to a wooden pole and comprises:
- four metric holes 13 in each corner to fasten the base plate 11 to a wooden pole,
- a shaft 12 in its middle.

The base plate could equally well be adapted to be fit to a concrete pole or to a metal tower. The shaft would be the same in all the cases.

Each of the six stems 2 have a U-shaped folded up end 4 delimiting the interior of a chamber 5, The opening of U of the U-shape is turned towards the center 3 of the frame 1.

Each stem 2 is on the opposite side of another stem along a diameter of said chamber 5.

Each of the U-shaped ends is connected to the ring 6.

The hollow axle 7 is going to be fitted into the shaft 12 to allow the rotation of the frame 1 around the shaft 12. Two unrepresented nuts welded on in 180° from each other with a through-hole inside to fit in with two unrepresented screws are in the middle of the hollow axle 7 in order to prevent unwanted turnings of the frame and to keep the frame from falling down.

The shaft 12 has an unrepresented groove across, where the two screws mounted on the hollow axle 7 have space to come inside in order to prevent the whole frame to jump out while turning.

The fastening plate 8 is a square formed metal plate welded onto two of the six stems. This plate 8 is also formed with two curved form slits holes 14 on top in order to adjust the position of a splicing box and a circular hole 18 on the bottom in order to fasten a splicing box as it will be explained in reference with FIG. 2.

The use of the system as described in reference with FIG. 1 is going to be described in reference with FIG. 2.

FIG. 2 is a diagram showing a system 10 of the invention with a coiled OPGW cable 15, said system being mounted on a wooden pole 16.

The system 10 comprises a splicing box 17 fastened to the fastening plate 8.

Several steps have to be described:

In a first step an operator climbs the pole and secures the base plate 11 to the pole at a desired height—about 3–5 meters—above the ground.

In a second step the operator measures desired length of the cable ends to be spliced in the splice box and cuts the cables.

In a third step the operator threads the cable ends inside the chamber 5 on the ground.

In a fourth step, the operator does the operations of cable splicing on the ground and installment of the splice in the box 17. At this step, there is a surplus represented by two portions of cable from the splicing box 17 on the ground and these two portions have to be coiled into the frame 1.

In a fifth step, the box 17 is fastened to the fastening plate 8 of the frame 1.

In a sixth step, the frame 1 with the splicing box is lifted by the operator climbing the wooden pole 16. He snaps the frame 1 onto the shaft 12 as represented in FIG. 1.

Then, the operator starts to push the two portions of cable 15 from underneath. The restoring force of the cable 15 is going to push and hold the cable against the U-shaped outer edges 2. Pushing and holding effects are going to induce the frame rotation. Therefore, the cable surplus length is coiled itself into the frame 1, without any further clamps holding the cable in place. The diameter of the frame may be some 80 to 100 cm and the number of turns may be some 4 to 8 turns.

When the cable 15 is coiled onto the frame 1, the frame 1 is locked by means on the axle 7 to prevent further rotation.

The splicing box 17 may be not positioned vertically. In that case, it is possible to adjust the position of the box 17 with the two curved form slits holes 14 on top of the fastening plate 8 in order to give a vertical position to the box 17.

Naturally, the present invention is not limited to the examples and embodiments described and shown, and the invention can be the subject of numerous variants that are available to the person skilled in the art.

The base plate can be plane in order to fasten a splicing box to a plate steel tower.

It is also possible to include another fastening plate to the frame in order to use another type of splicing box.

What is claimed is:

1. Frame for coiling a surplus splice length of an overhead cable installed on poles or towers said frame comprising: a coiling chamber for the coiling of said surplus splice length, wherein said coiling chamber further comprising;
    an interior in which said surplus splice length is coiled,
    an outer edge allowing the free rotation of said frame about a shaft, said surplus splice length being pushed from underneath by an operator and being further pushed and held by its own restoring force against said outer edge of said coiling chamber, said pushing and holding effects inducing said rotation of said frame.

2. Frame according to claim 1, further comprising an axle in the center of said chamber.

3. Frame according to claim 2 wherein said axle is an hollow axle to be fitted into the shaft in order to allow the rotation of said frame around said shaft.

4. Frame according to claim 2 wherein said axle includes means for locking the coiling frame in order to prevent a rotation of said frame and to prevent said frame from falling down.

5. Frame according to claim 1 wherein said frame has a circular shape.

6. Frame according to claim 1 wherein said frame further comprises at least four stems extending from the center of said frame, each one of said stems having a U-shaped folded up end delimiting said interior of said coiling chamber.

7. Frame according to claim 6 wherein said frame comprises six stems and said coiling chamber has a circular shape, each stem being on the opposite side of another stem along a diameter of said coiling chamber.

8. Frame according to claim 6 wherein the opening U of said U-shape and is turned towards the center of said frame.

9. Frame according to claim 6 wherein each of said U-shaped ends is connected to a ring centered in the center of said chamber.

10. Frame according to claim 1 wherein said frame further comprises a fastening plate in order to fasten a splicing box to said frame.

11. Frame according to claim 10 wherein said fastening plate further comprises means for adjusting the position of said splicing box.

12. System for splicing overhead cable having a frame according to claim 1, wherein said system further including means for attaching said frame to a predetermined height of a pole or a tower.

13. System according to claim 12 wherein said frame further comprises a hollow axle in the center of said chamber, said means for attaching including a shaft, said hollow axle being rotatable around said shaft.

14. System according to claim 12 wherein said means for attaching is a curved base plate such that said frame can be attached to a cylindrical pole like a wooden pole.

15. System according to claim 12 wherein said means for attaching is a plane base plate such that said frame can be attached to a steel tower.

16. System according to claim 12 further comprising a fastening plate in order to fasten a splicing box to said frame and a splicing box fastened to said fastening plate.

17. System according to claim 12 further comprising means for including a branch-off overhead or underground cable in the frame and in the splicing box.

18. Method for coiling a surplus splice length of an overhead cable installed on a pole or a tower using a system according to claim 16 having the following steps:

threading the cable ends to be splice inside said chamber on the ground, splicing said cable ends and installing the splice in said splicing box on the ground, two portions of cable representing said surplus splice length, fastening said splicing box to said fastening plate of said frame, lifting said frame with said splicing box at said predetermined height of said pole or said tower, snapping said frame onto said shaft, pushing said surplus splice length from underneath, said surplus splice length being further pushed and held by its own restoring force against said outer edge of said coiling chamber, said pushing and holding effects inducing said rotation of said frame.

19. System for splicing overhead cable having a frame for coiling surplus splice length of an overhead cable installed on poles or towers, said system comprising:

means for attaching said frame to a predetermined height of a pole or a tower, in order to allow the rotation of said frame, wherein said frame maintains a coiling chamber for the coiling of said surplus splice length, and wherein said coiling chamber maintains;

an interior in which said surplus length is coiled, an outer edge allowing the free rotation of said frame about one shaft;

a plurality of stems extending from the center of said frame each one of said stems having a u-shaped folded up end delimiting said interior of said coiling chamber, said surplus splice length being pushed from underneath by an operator and being further pushed and held by its own restoring force against said U-shaped folded up end of said coiling chamber, said pushing and holding effects including said rotation of said frame.

* * * * *